United States Patent Office 3,228,741
Patented Jan. 11, 1966

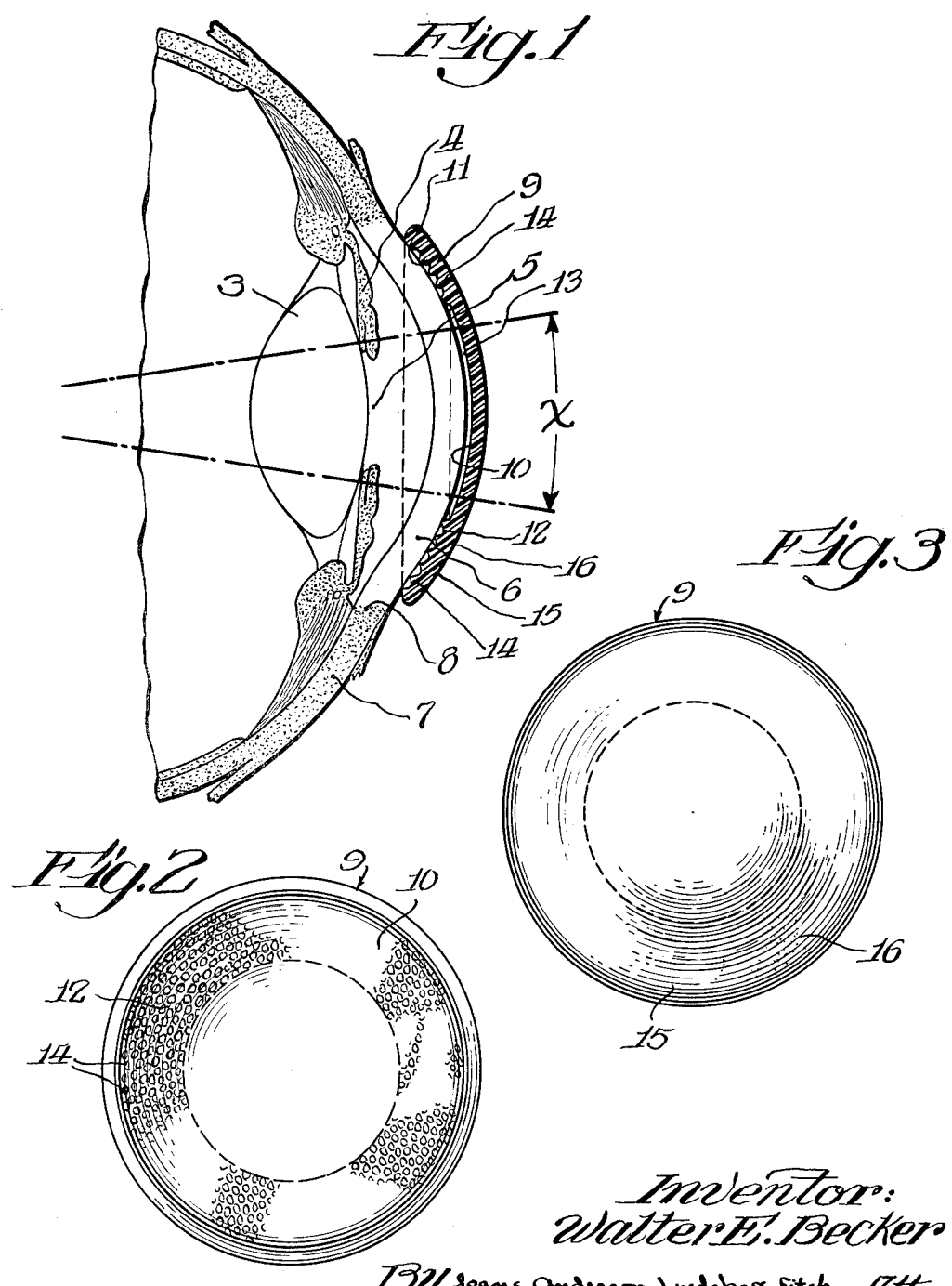

3,228,741
CORNEAL CONTACT LENS FABRICATED FROM TRANSPARENT SILICONE RUBBER
Walter E. Becker, Pittsburgh, Pa., assignor to Mueller Welt Contact Lenses, Inc., Chicago, Ill., a corporation of Illinois
Filed June 29, 1962, Ser. No. 206,281
6 Claims. (Cl. 351—160)

This application is a continuation-in-part of my copending application Serial No. 834,752, now abandoned, which was a continuation-in-part of my earlier filed application Serial No. 774,772, now also abandoned.

The present invention generally relates to contact lenses and more particularly relates to a corneal type contact lens for application to the human eye to correct vision deficiencies.

Scleral type contact lenses have been utilized to correct human vision deficiencies. Such lenses extend both over the cornea of the eye and over the sclera of the eye. The most important factor in this respect is the partial asphyxiation of the eye which adversely affects the vision.

Scleral type contact lenses have not been entirely successful. This is largely due to the fact that such lenses cover a very large area of the eye which tends to cause partial asphyxiation which in turn affects the metabolism and vision of the eye.

Corneal contact lenses are smaller, lighter weight contact lenses which cover only a slightly smaller area than the cornea of the eye and do not extend to the limbus of the eye. Corneal contact lenses have found greater acceptance with the public, since they usually cause less interference with corneal metabolism and therefore less irritation to the cornea.

However, both scleral and corneal contact lenses have conventionally been fabricated of glass or relatively hard plastic materials. Accordingly, even conventional corneal contact lenses produce some eye irritation. A "break in" period is usually necessary in order to acclimatize the cornea, that is, accustom the cornea to support a contact lens in direct contact therewith. Such "break in" period may vary considerably, depending upon the individual sensitivity of the cornea, but even with corneal contact lenses, the "break in" period is usually a considerable length of time. Some persons have found it so difficult to wear contact lenses continuously for any extended period of time because of eye irritation that they have discarded the contact lenses, despite the obvious advantages of the lenses, including their cosmetic effect.

A psychological problem is also ordinarily encountered, in that the wearer of contact lenses is usually at least initially apprehensive of having a hard object applied to the surface of the eye.

Various attempts have been made to design hard corneal and scleral contact lenses so that the lenses have reduced irritability to the eye. Thus, contact lenses have been made with various radii of curvature. While such lenses are an improvement over scleral type lenses, they still tend to cause excessive irritation to the eye.

Conventional scleral and corneal contact lenses are both subject to physical damage, i.e., they are readily scratched and can be broken if mistreated.

Some attempts have been made to overcome both the eye irritation problem and the breakage problem by using softer materials in scleral portions of certain contact lenses in combination with hard corneal central portions. Such combination contact lenses are both relatively large and expensive, and have not found acceptance with the public.

A further difficulty encountered with conventional contact lenses is beading up of tear fluid on the lens surfaces due to surface tension, so that the wearer is required to look through a discontinuous area, that is both air and drops of accumulated tear fluid. Some distortion of vision results. Optical coatings and/or the use of wetting agents are required in many cases to overcome this problem.

Although conventional corneal contact lenses can be worn for periods of several hours up to 10 or so hours at a time, in some cases, after the described "break in" period, they are not suitable for continued use on the eye for extended periods of time. In this regard, they are constructed of materials which substantially completely prevent transfer of gases therethrough. Conventional contact lenses tend to inhibit the normal metabolism of the cornea and if worn for a sufficiently continuous period can produce changes in the cornea which are indicative of asphyxiation of the cornea, tending to reduce the viability and efficiency of the cornea.

The cornea is a living tissue and has very active metabolism involving carbohydrates, enyzmes and oxygen. Waste products, including lactic acid, carbon dioxide and water, are generated during such metabolism and must be expelled from the cornea. The cornea has highly specified functions not required of other tissue, including the necessity of remaining transparent. It must carry out its complicated metabolic functions in the absence of a vascular system. In order for the cornea to remain transparent, it must be maintained partially dehydrated yet be supplied wtih sufficient nutrients which normally are transported in tissue fluids. It must receive an adequate supply of oxygen and be able to release carbon dioxide. In the absence of contact lenses, the corneal epithilium takes up oxygen and releases carbon dioxide. Tear fluids dispose of accumulated lactic acid and also aid in oxygen and carbon dioxide transfer.

The epithilium of the cornea apparently consumes much of the oxygen required by the cornea, which consumption requirement approximates that of other soft tissue. Thus, it has been found that the entire cornea uses about 4 cmm. of oxygen per mg. of dry weight, which is about $4/7$ as much as liver, $2/3$ as much as muscle tissue and 4 times as much as cartilage.

When the oxygen uptake of the cornea has been reduced for an extended period of time, as by continuous use of conventional contact lenses for extended periods of time, the cornea will become edemous, the transparency and efficiency thereof being reduced. Moreover, when the flow of tear fluids in contact with the cornea is restricted, as by wearing tight corneal contact lenses, the epithilium wrinkles and forms craters, and gas bubbles collect under the lenses and impede vision. Thus, not only are the metabolic functions of the cornea disturbed, but the normally relatively smooth surface of the cornea is changed.

Attempts have been made to drill small holes in contact lenses in order to correct these problems but the presence of such holes in the lenses has created optical and mechanical problems of their own, and accordingly, such a procedure is not generally suitable.

Inasmuch as conventional contact lenses usually are not worn for more than about 8 or 10 hours at a time, the debilitation of the cornea due to inhibition of normal metabolism is transitory and the cornea recovers its normal metabolism, during the period of each day when the contact lenses are not worn.

However, it will be realized that in certain instances, the wearer may desire or be required to wear contact lenses for a more extended continuous period of time. In such instances, there is considerable danger to the cornea.

It would be highly desirable if contact lenses could be provided which would be sufficiently soft to allow them to be worn for an indefinite period of time without substantial irritation to the cornea, and which would also allow improved transfer of gases therethrough so as to not materially interfere with the normal metabolism processes of the cornea. Further hard material sloughs off corneal cells at a faster rate than they can be normally replaced and is the main cause of corneal abrasion which is ever present with the presently used hard corneal lenses. A material which is similar in softness to that of the upper lid is most desirable as having the least traumatic effect on the cornea. Such contact lenses could then be worn with safety for continuous periods of time substantially in excess of those feasible with conventional contact lenses.

Such a contact lens has now been discovered. The contact lens of the present invention is primarily of the corneal type and can be worn for considerably longer periods of time than heretofore possible and with less discomfort and without impairment to vision or normal metabolism of the cornea and with less trauma to the cornea. One aspect of the present invention provides means whereby the surface tension normally encountered in a contact lens is reduced and whereby the degree of slippage and displacement of the lens in place on the cornea is also reduced. Furthermore, the lens is constructed of material which has a softness approximating that of the inner surface of the eyelids so that irritation and trauma of the cornea and eyelid is minimal and so that the conventional "break in" period is reduced or eliminated. The contact lens is highly permeable to carbon dioxide, oxygen and water vapor and in one embodiment also has means for transfer of tear fluids into and out of contact with the cornea when the contact lens is worn. Moreover, the improved contact lens is substantially unbreakable and can be inserted and removed from the eye with improved ease and convenience. Although it is very soft and can be bent upon itself without cracking or breaking, the contact lens retains its initial radii of curvature after distortion. It is very light, thin and non-irritating to the eye and has the optical properties of high quality optical glass. It also can have its index of refraction varied for example, from 1.49 to 1.56 by the addition of the proper amount of filler material so that high corrective errors need not be made into a thicker lens.

Accordingly, it is the principal object of the present invention to provide an improved contact lens. It is a further object of the present invention to provide an improved corneal type contact lens which has a reduced tendency to irritate the eye, including the cornea and eyelids. It is a further object of the present invention to provide an improved corneal contact lens which has a reduced tendency to interfere with corneal metabolic processes. It is a further object of the present invention to provide a corneal contact lens which has improved gas transmissibility. It is a still further object of the present invention to provide a corneal contact lens which reduces or limits problems with surface tension. It is a further object of the present invention to provide a corneal contact lens which minimizes trauma to the cornea of the eye. It is also an object of the present invention to provide a corneal contact lens which permits free flow of tear fluids into and out of contact with the cornea. It is a still further object of the present invention to provide a relatively unbreakable, resilient, soft corneal contact lens which can be made so as to return to its initial radii of curvature after either partial distortion or substantially complete distortion.

Further objects and advantages of the present invention will be apparent from a study of the following detailed description and of the accompanying drawings of which:

FIGURE 1 is a vertical cross section illustrating the human eye to which is applied one embodiment of a corneal contact lens incorporating certain features of the present invention;

FIGURE 2 is a rear elevation illustrating the concave surface of the contact lens of FIGURE 1; and, FIGURE 3 is a front elevation illustrating the convex surface of the contact lens of FIGURE 1.

The present invention generally comprises an improved contact lens for use on the human eye. More particularly, the contact lens is substantially permeable to carbon dioxide, oxygen and at least partially permeable to water vapor. It is preferably of the corneal type and has a softness which approximates that of the human cornea and eyelids. It has substantially complete flexibility and bendability so as to be essentially unbreakable which combined with its softness render it substantially non-irritating when placed in contact with the human eye.

Moreover, the lens is fabricated of material which is essentially inert to the atmosphere and to tear fluids, neither being affected thereby, nor effecting irritations of the eye. Furthermore, the contact lens can be made so that even when subjected to substantially complete distortion it is capable of returning to its initial shape so that no problems are encountered with maintaining desired radii of curvature for the lens. Moreover, the contact lens is durable, resistant to scratching, light weight, transparent (with optical properties of high quality optical glass) and may have reduced surface tension. It is capable of being tinted to any desired color and treated with optical coating agents and the like.

It can be formed in a single molding operation to any desired configuration, including a configuration which provides means for facilitating the transfer of tear fluids from the periphery of the lens to the center thereof overlying the cornea.

Now referring more particularly to FIGURE 1 of the accompanying drawings, one embodiment of the contact lens of the present invention is illustrated in vertical cross section in place on a human cornea. Now referring to the anatomy of the human eye, as illustrated in FIGURE 1, a lens 3 is illustrated over which is disposed an iris 4, the contractile aperture of which defines a pupil 5. The cornea 6 is, in turn, disposed over the pupil and is surrounded by the sclera 7, the border therebetween being termed the limbus 8 of the eye.

As shown in FIGURE 1, a corneal contact lens 9 is provided over the cornea. The lens 9 is fabricated of transparent material having a softness approximating that of the cornea and eyelids and is completely resilient and flexible.

The material from which the lens is fabricated is transparent silicone rubber, more particularly hydrocarbon substituted polysiloxane rubber. Such material is one or more long chain siloxanes which have been mixed with a suitable filler, that is, a clear material such as pure silica or the like, and then have been polymerized through the use of a suitable catalyst to produce the final rubbery product. The concentration of filler material is regulated to aid in controlling the flexibility, pliability and resiliency of the lens.

A dichlorohydrocarbon substituted silane, for example, dimethyl dichloro-silane can be hydrolyzed and straight chain polymerized to produce dimethyl polysiloxane which is a liquid having a viscosity ranging from a thin watery condition to a heavy viscous liquid, depending upon the degree of polymerization. The dimethyl polysiloxane so produced is in generally what is known as a gum grade or condition and as such is mixed with, as previously indicated, pure, finely divided silica filler material or other filler capable of producing a clear transparent product and a suitable polymerization catalyst, for example, a peroxide, such as hydrogen peroxide or benzoyl peroxide preferably the latter. The mixture is then molded and cured with heat, further polymerizing by cross-linking to produce the finished clear lens, the softness of the lens being readily controllable during manufacture thereof by varying not only the amount of the filler material but also the treating conditions. The filler material may be present in a concentration of up to about 40 percent, by weight of the composition.

Other hydrolyzed hydrocarbon substituted silanes may be used in place of dimethyl polysiloxane in preparing the contact lenses. Such substituted silanes may include ethyl, vinyl, or phenyl radicals. However, preferably, the material utilized is dimethyl polysiloxane with less than 5 percent and more preferably less than 2 percent of silanes present containing radicals other than the methyl radical. It will be understood that the product may comprise polymers of dimethyl polysiloxane or copolymers of the indicated dimethyl polysiloxane with siloxanes having phenyl, vinyl, ethyl and other hydrocarbon radicals. A particularly advantageous commercially available dimethyl polysiloxane material for use in the preparation of the contact lens of the present invention is sold under the registered trademark "Silastic S" by Dow Corning Corporation of Midland, Michigan.

It will be readily understood that the usual types of plastic materials, such as vinyl plastics, acrylic resins and the like do not provide the requisite properties for the purposes of the present invention. Although certain of such plastics have been previously employed in contact lenses, they are relatively inelastic and cannot be distorted completely without damage thereto. Such plastics, if bent upon themselves, usually break or become permanently deformed. Being relatively hard and inelastic, such plastics are not durable. Some of such plastics tend to further polymerize and become less elastic and more brittle upon long continued exposure to light, air, etc. Moreover, such plastics do not have desirably high gas permeability. Accordingly, when fabricated into contact lenses and when worn for long periods of time, they interfere with normal corneal metabolism.

A shape-retaining contact lens can be readily produced in final form from the indicated mixture of polysiloxane, filler material and catalyst by placing the mixture in a suitably shaped die, comparable in general form to the usual dies for molding plastic contact lenses. In the die, the mixture is subjected to hot pressing under a pressure of, for example, 5–20 tons or more and at a suitable molding temperature, for example about 300° F. The hot pressing is carried out for a period of time sufficient to set the lens to a desired shape-retaining form. Hot pressing times of the order of 5–20 minutes, for example, have been successfully utilized. However, the particular hot pressing time depends upon the characteristics desired in the finished product, the temperature and pressure of the system, the particular configuration of the lens, the particular constituents and their relative concentrations, and the expected curing conditions.

Following the hot pressing operation, the lens is removed from the die or mold, and is then cured at a controlled temperature and atmospheric pressure for a suitable period of time depending upon the above-indicated factors. For thin lenses, times as short as 12 hours at 300° F. have been successfully utilized. Generally, longer baking times at a given temperature result in harder, less resilient, less pliable contact lenses. However, in each instance a minimum curing time is necessary in order to preserve the shape-retaining characteristics of the lens and to permanently fix the necessary resiliency, pliability, flexibility and strength. A contact lens is thereby produced which has a softness about equal to that of the cornea itself and the eye lids. Such product has very high permeability to oxygen, carbon dioxide and water vapor so that it can be worn for a substantially longer period of time without materially interfering with corneal metabolism. Moreover, the product will not warp or change shape, even when subjected to relatively high temperatures.

Following the curing operation, the lens can be cooled to ambient temperature and suitably worked to final shape, as by grinding, cutting, sanding, etc. The contact lens can be worked utilizing simplified equipment.

In the embodiment illustrated in FIGURE 1 of the accompanying drawings, the concave or inner surface 10 of the contact lens has substantially the same radius of curvature as the cornea and is of a size somewhat smaller than the limbus portion of the eye of the wearer but somewhat larger than the maximum iris opening. Accordingly, it is a corneal contact lens rather than a scleral contact lens. However, in certain instances, it may be desirable to have the lens sufficiently large so that it is in effect a scleral contact lens.

Since the concave surface 10 of the contact lens is shaped to coincide with substantially the same radius of curvature as the cornea, it tends to adhere to the cornea and float thereon, being separated therefrom only by a thin film of tear fluid, the latter effecting capillary adhesion between the lens and the cornea. Such adhesion reduces the possibility of dislodging the lens from its position on the cornea and also decreases improper or excessive relative movement between the lens and cornea, thereby reducing the degree of irritation which is normally present with corneal contact lenses. This effect alone increases the normal wearing time of the lens.

As indicated above, one can readily control the softness and flexibility of the present lens by varying the amount of filler material and the treating conditions. It is therefore possible to form the present lens of sufficient softness so that it will conform to the contour of the cornea on which it is worn. A lens of this type is preferably used on a cornea which is not astigmatic. However, it is possible to mold a cylindrical as well as a spherical curve into the concave or convex surface of such a lens to correct for astigmatism as well as other vision defects. If one desires, one can therefore provide a flexible lens which follows the topography or contour of the cornea and at the same time correct for all visual defects of the cornea.

The following example illustrates further features of the present invention.

EXAMPLE

Transparent polysiloxane rubber (silicone rubber) identical in all characteristics to that of the contact lens of the present invention was tested for gas porosity, along with other transparent plastic materials, including those used in conventional plastic contact lenses, such as methyl methacrylate (Plexiglas—registered trademark of du Pont de Nemours Company, Wilmington, Delaware). The results are set forth in the table below:

*Table*

GAS TRANSMISSION RATES OF PLASTIC FILMS

[Measured at or calculated to 1 mil thickness]

| Film | $O_2$ [1] | $CO_2$ [3] | $H_2O$ Vapor [2] |
|---|---|---|---|
| (1) Polyvinylidene Chloride (Saran) | 1.03 | .78 | .25 |
| (2) Monochlorotrifluoroethylene (Trithene A) | 1.5 | 16 | .04 |
| (3) Polyester (Mylar) | 11.06 | 19.4 | 1.5 |
| (4) Cellulose Acetate | 110 | 560 | 90 |
| (5) Opaque High Density Polyethylene | 142.0 | 348 | .25 |
| (6) Polypropylene | 187.0 | 639 | .7 |
| (7) Clear High Density Polyethylene | 226 | 1,030 | |
| (8) Polystyrene | 310 | 1,535 | 7.2 |
| (9) Low Density Polyethylene | 573 | 1,742 | 1.2 |
| (10) Tetrafluoroethylene (Teflon TFE) | 1,100 | 3,000 | .32 |
| (11) Ethyl Cellulose (Ethocel) | 1,600 | 6,500 | 75 |
| (12) Silicone Rubber (Silastic S-2000) | 98,000 | [3] 519,000 | 170 |
| (13) Silicone Rubber* | 2,800 | | |
| (14) Silicone Rubber* | 3,300 | | |
| (15) Polymethyl Methacrylate (Plexiglas)* | 0.56 | | |

*Measured at 20 mil thickness.

[1] Transmission rates expressed as cubic centimeters of gas transmitted through 1 mil film per 24 hours per 100 sq. inches of film, with one atmosphere pressure differential across the film; measured at 77° F. (cc./24 hrs./100 in.²/atmosphere).

[2] Water vapor transmission rate expressed as grams transmitted through 100 sq. in. per 24 hrs. where one side of film is exposed to 90% relative humidity at 100° F. and the other side is essentially 0% relative humidity by use of calcium chloride.

[3] $CO_2$ transmission rate was calculated from the experimentally found equation, $O_2$ transmission $\times 5.3 = CO_2$ transmission.

The ASTM standard method for measuring the gas porosity or the gas transmission rate through plastic sheeting is designated DI 434-58. This test was employed in obtaining the figures set forth in the table above. The test is briefly summarized as follows:

The measurement is made of the volume of test gas, converted to standard temperature and pressure, which passes through a known area of the specimen per unit of time, expressed in units or cc.'s of gas at 0° C. and at atmospheric pressure per 100 square mm. per 24 hours per 1 atmosphere differential.

In carrying out the test, a measured volume of the test gas, in this instance oxygen or water vapor is placed on one side of grease-free pin-hole free, wrinkle-free sheet of the test plastic sheet. The opposite side of the plastic sheet faces into an initially evacuated calibrated chamber. Manometer readings indicate the rate of pressure build-up within the evacuated chamber, from which the desired calculation of gas transmission rate can be effected.

The table set forth above clearly indicates the extremely large difference in the gas permeability of the polysiloxan (silicone rubber) material from which the contact lens of the present invention is fabricated, in contrast to other conventional clear plastic materials. Not only is the oxygen transmission rate very much higher, but so also are the carbon dioxide transmission rate and the water vapor transmission rate thereof. When compared with methyl methacrylate polymer (Plexiglas), it was found that the silicone rubber used in the contact lens of the present invention had a permeability 4000 times greater with respect to oxyen, and an immeasurably higher permeability to carbon dioxide. Other plastics have gas transmission rates which are very low, and comparable to those of the methyl methacrylate polymer.

For the purposes of the present invention it is preferred that the oxygen transmission rate, in cm.$^3$ through 1 mil film/24 hours/100 sq. inches/1 atmosphere differential be at least about 10,000.

In order to determine whether the greatly increased gas permeability of the polysiloxane (silicone) rubber material utilized in the contact lens of the present invention produced a significant difference with respect to corneal metabolism in contrast to conventional plastic contact lenses fabricated of methyl methacrylate polymer, a series of tests were performed utilizing rabbits.

When methyl methacrylate contact lenses were applied to the corneas of rabbits and worn for a period of 24 continuous hours, at the end of such period the corneas in each instance exhibited punctate staining and abrasions indicative of partial asphyxiation of the corneas, due to trapping of carbon dioxide under the lenses and also deprivation of the cornea of oxygen. In contrast, contact lenses fabricated of the polysiloxane rubber in accordance with the present invention and of identical size and shape to the methyl methacrylate polymer lenses, when worn by rabbits under identical conditions for a continuous period of 24 hours had no such effect. In each instance, the corneas were clear and showed no signs whatever of asphyxiation.

In a further test, one rabbit was purposely fitted with a tight lens fabricated of the polysiloxane material in order to purposely induce abrading of the corneal epithelium. Abrasions were caused but healed rapidly directly under the contact lens, clearly indicating that the cornea was receiving sufficient oxygen through the contact lens and that carbon dioxide was being disposed efficiently through the contact lens.

Further experiments were run over more extended periods of time. It was found that both rabbits and dogs exhibited pronounced vascularization of the cornea upon continuous wear of polymethyl methacrylate contact lenses for periods of 3–5 weeks. In contrast, a rabbit has worn the polysiloxane contact lens of the present invention continuously for over 4 months and at the end of that period of time exhibited only a very few small vessels in the cornea.

Experiments with contact lenses on human patients have tended to confirm the above results. It has been definitely found that under normal conditions of use, the corneal contact lens of the present invention can be safely and comfortably worn for significantly longer periods of time than can conventional plastic corneal contact lenses, such as polymethyl methacrylate lenses. The results obtained clearly indicate that the observed improvements are due both to the decreased irritation to the eye (because of extreme softness, flexibility and pliability of the contact lens) and to the improved transmission of gases through the contact lens.

The known human corneal oxygen utilization rate is about 4 cubic mm. of oxygen per hour/mg. dry weight. The total oxygen required for a normal human cornea over a 24 hour period can be calculated as about 3.264 cc. The oxygen transmission through the effective area of about 7.5 mm. diameter in the contact lens of the present invention for a contact lens having an average thickness of about 8 mil is about 4.96 cc. of oxygen for a 24 hour period. Accordingly, the lens is capable of transmitting to the cornea all oxygen which is needed to meet the metabolic requirements of the cornea. Such transmission rate is at least 4000 times higher than that of the next most promising clear plastic contact lens material, polymethyl methacrylate. Carbon dioxide transmission rates are comparably higher, of the order of 2–3 times higher, for the contact lens of the present invention, completely adequate to take care of removal from the cornea of all carbon dioxide arising as a waste product of corneal metabolism.

The human cornea normally has a film of tear fluid disposed thereover so that oxygen and carbon dioxide in contact with the corneal surface are at least partly in solution in the tear fluid. Carbon dioxide and oxygen come out of solution is passing from the fluid into the cornea and through the contact lens of the present invention.

However, it is of importance to provide a normal flow of tear fluid over the surface of the cornea when the contact lens is in place. This facilitates both gas transfer to and from the cornea and also effects proper protective lubrication for the corneal surface to minimize abrasive damage of the corneal epithelium by the contact lens.

In the embodiment illustrated in FIGURES 1 to 3 of the accompanying drawings, additional means 11 are provided integral with the contact lens to facilitate the normal flow of tear fluid to and from the cornea. Such means are not essential to the contact lens and may be omitted. However, it may be incorporated as an addition features in the contact lens construction. It is therefore included herein. In this respect, the inner surface 10 of the contact lens 9 illustrated in FIGURE 1 is provided in the peripheral area thereof with a plurality of ducts or channels 12. As shown in FIGURE 2, the channels from the peripheral edge of the lens 9 to a central unchanneled pool area 13 between the lens 9 and the cornea. The channels 12 can be formed by raised projections 14, as shown in FIGURE 1, or by depressions or cuts (not shown) in the peripheral portion of the lens 9. Usually, the projections 14 are preferred, since they increase rather than diminish the strength of the peripheral portion of the lens 9. They can be produced by suitable grinding of the walls of the lens-forming die, before molding the lens, or by other means. In order not to interfere with maximum vision, it is desirable that the channels 12 not extend into the central pool area 13 which covers the maximum opening of the iris, as shown in FIGURE 1.

It is believed that the channels 12 so formed have a particular cooperative effect with the eyelids in facilitating the flow of tear fluids to and from the cornea. In this respect, when the eyelids close over the lens 9, they tend to press the periphery of the soft lens 9 toward the eye while, conversely, when the eyelids open during the blinking reflex the resilient lens 9 tends to return to its initial shape. This alternate bending down and springing back of the periphery of the lens 9 creates a type of pumping action upon the tear fluid around the outer edge of the lens 9, tending to draw the tear fluid into and through the channels 12 to the central pool area 13. In any event, it has been found that when the described channels 12 are incorporated into the soft contact lens 9 of the present invention, further reductions in irritations of the eye and further extention of the period of time which the lens 9 can be continuously worn with comfort are provided.

Although the contact lens is firmly held in position on the cornea, it is so soft and flexible that it can be readily removed merely by squeezing it together and breaking the suction between the lens 9 and the eye.

A further improvement illustrated in the contact lens 9 shown in FIGURE 3 reduces the surface tension of tear fluid on the outer or convex surface 15 of the lens 9, preventing tear fluid from beading up on the convex surface of the contact lens 9. In this regard, small depressions 16 are formed in the convex surface 15 of the lens 9 to provide a matte finish. The depressions are so small as to be non-irritating to the eyelids and when depressions 16 are filled with tear fluid, they are invisible and do not impede normal vision. The desired matte finish may be provided on the convex surface of the contact lens 9 in any suitable manner, for example, by rough grinding the surface of the lens molding die corresponding to the convex surface of the contact lens so as to provide it with a semi-smooth finish rather than a highly polished finish.

The matte finish on the convex surface of the contact lens and also the projections or channels along the periphery of the concave surface of the contact lens do not cause eye and eyelid irritation since the whole contact lens is fabricated of the described soft material.

Accordingly, an improved contact lens, primarily of the corneal type, is provided which contact lens has increased durability and utility and which allows the wearer to more readily adapt thereto than conventional contact lenses. The contact lens extends the period of normal use without substantial irritation of the eye and eyelids and without danger to the wearer. Further advantages of the present invention are set forth in the foregoing.

Various of the features of the present invention are set forth in the appended claims.

What is claimed is:

1. An improved corneal contact lens of concavo-convex shape adapted to float on and adhere to the cornea, said lens having a concave surface curvature substantially conforming to the cornea, said lens being fabricated from transparent silicone rubber having a softness approximating that of the human cornea, said contact lens being bendable upon itself and capable of returning to its original shape upon release of distorting forces and being substantially unbreakable, said silicone rubber having a gas permeability for oxygen and carbon dioxide of at least about 10,000 cc. per 24-hour period per 100 square inch area per 1 mil thickness at a pressure differential of one atmosphere, thereby providing a contact lens which is substantially non-absorptive of tear fluids in liquid form and whose gas permeability is sufficient to substantially increase its normal safe wearing time.

2. The corneal contact lens of claim 1 wherein said silicone rubber comprises a cured mixture of hydrocarbon substituted polysiloxane and finely divided silica.

3. The corneal contact lens of claim 2 wherein the components of the mixture are selected to provide an index of refraction within the range of from 1.49 to 1.56.

4. The corneal contact lens of claim 1 wherein said silicone rubber comprises a mixture of dimethyl polysiloxane and finely divided silica cured to form a rubbery transparent product.

5. The contact lens of claim 1 wherein said contact lens has fluid channel means in the peripheral portion of the concave surface thereof opening into a substantially smooth pool area in the central portion thereof, whereby tear fluid is readily conductible into the entire area between the contact lens and the cornea when the contact lens is worn.

6. The contact lens of claim 1 wherein the convex surface of said lens has a matte finish which substantially reduces surface tension of tear fluids in contact therewith.

References Cited by the Examiner

UNITED STATES PATENTS

| | | | |
|---|---|---|---|
| 2,129,305 | 9/1938 | Feinbloom | 88—54.5 |
| 2,211,086 | 8/1940 | Tillyer | 88—54.5 |
| 2,240,157 | 4/1941 | Gagnon et al. | 88—54.5 |
| 2,241,415 | 5/1941 | Moulton | 88—54.5 |
| 2,247,628 | 7/1941 | Beitel | 88—54.5 |
| 2,330,837 | 10/1943 | Mullen | 18—56 |
| 2,664,025 | 12/1953 | Herman | 88—54.5 |
| 2,972,349 | 2/1961 | Dewall. | |
| 2,976,576 | 3/1961 | Wichterle et al. | |
| 3,015,331 | 1/1962 | Warrick. | |
| 3,036,985 | 5/1962 | Daudt | 88—54.5 |
| 3,093,447 | 6/1963 | Crandon | 18—58 |

FOREIGN PATENTS

| | | |
|---|---|---|
| 222,917 | 6/1959 | Australia. |
| 931,007 | 9/1947 | France. |
| 921,416 | 12/1954 | Germany. |

OTHER REFERENCES

Wichterle: German application 1,065,621 printed Sept. 17, 1959 (KL 39C 25/01).

DAVID H. RUBIN, *Primary Examiner.*

UNITED STATES PATENT OFFICE
CERTIFICATE OF CORRECTION

Patent No. 3,228,741                Dated January 11, 1966

Inventor(s) Walter E. Becker

It is certified that error appears in the above-identified patent and that said Letters Patent are hereby corrected as shown below:

Column 6, lines 44-45, "such as methyl methacrylate (Plexiglas - registered trademark of du Pont de Nemours Company, Wilmington, Delaware)." should read -- such as methyl methacrylate (Plexiglas - registered trademark of Rohm and Haas Company, Philadelphia, Pennsylvania ). --.

Signed and sealed this 19th day of December 1972.

(SEAL)
Attest:

EDWARD M. FLETCHER, JR.
Attesting Officer

ROBERT GOTTSCHALK
Commissioner of Patents